Patented July 24, 1951

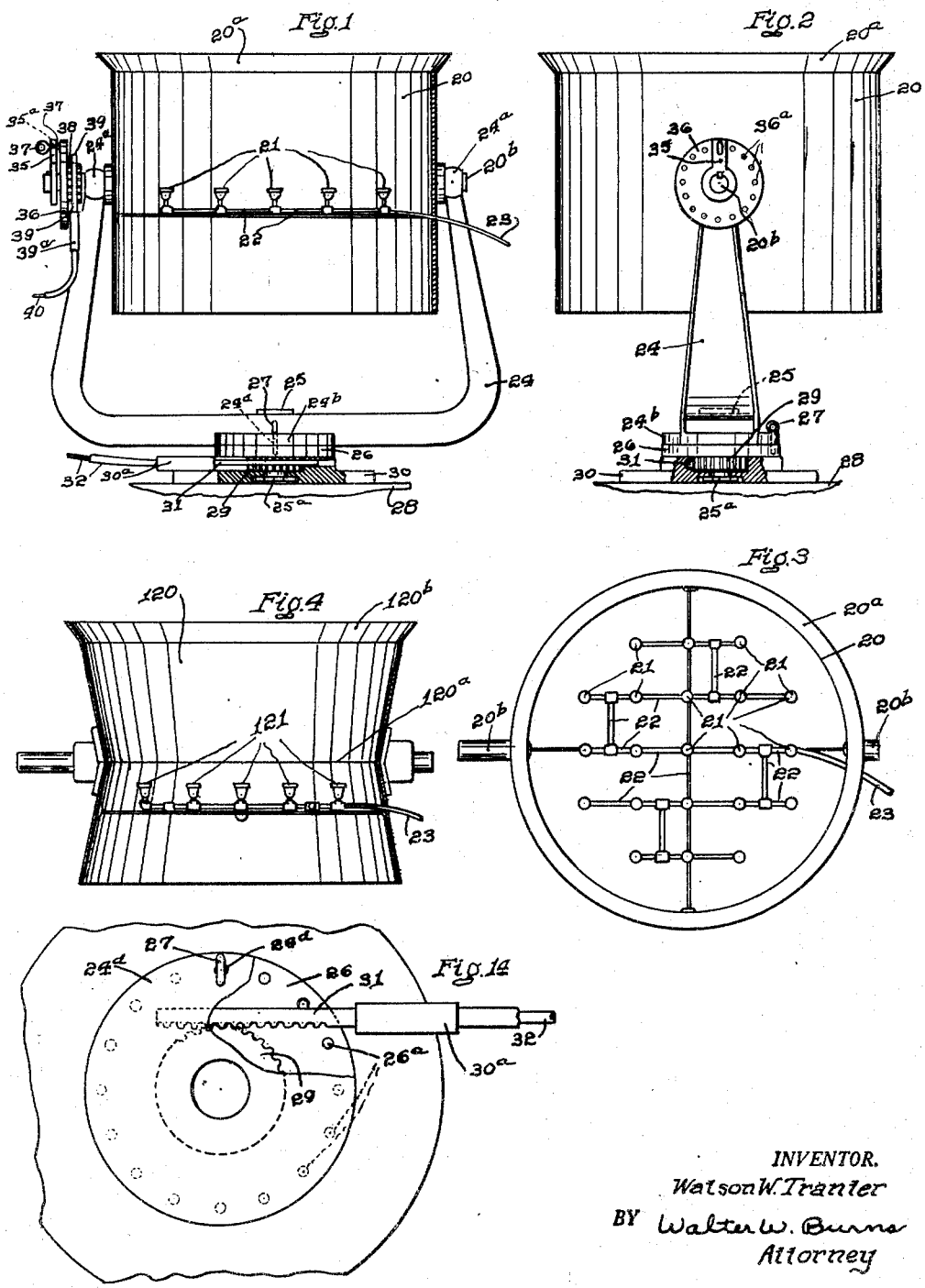

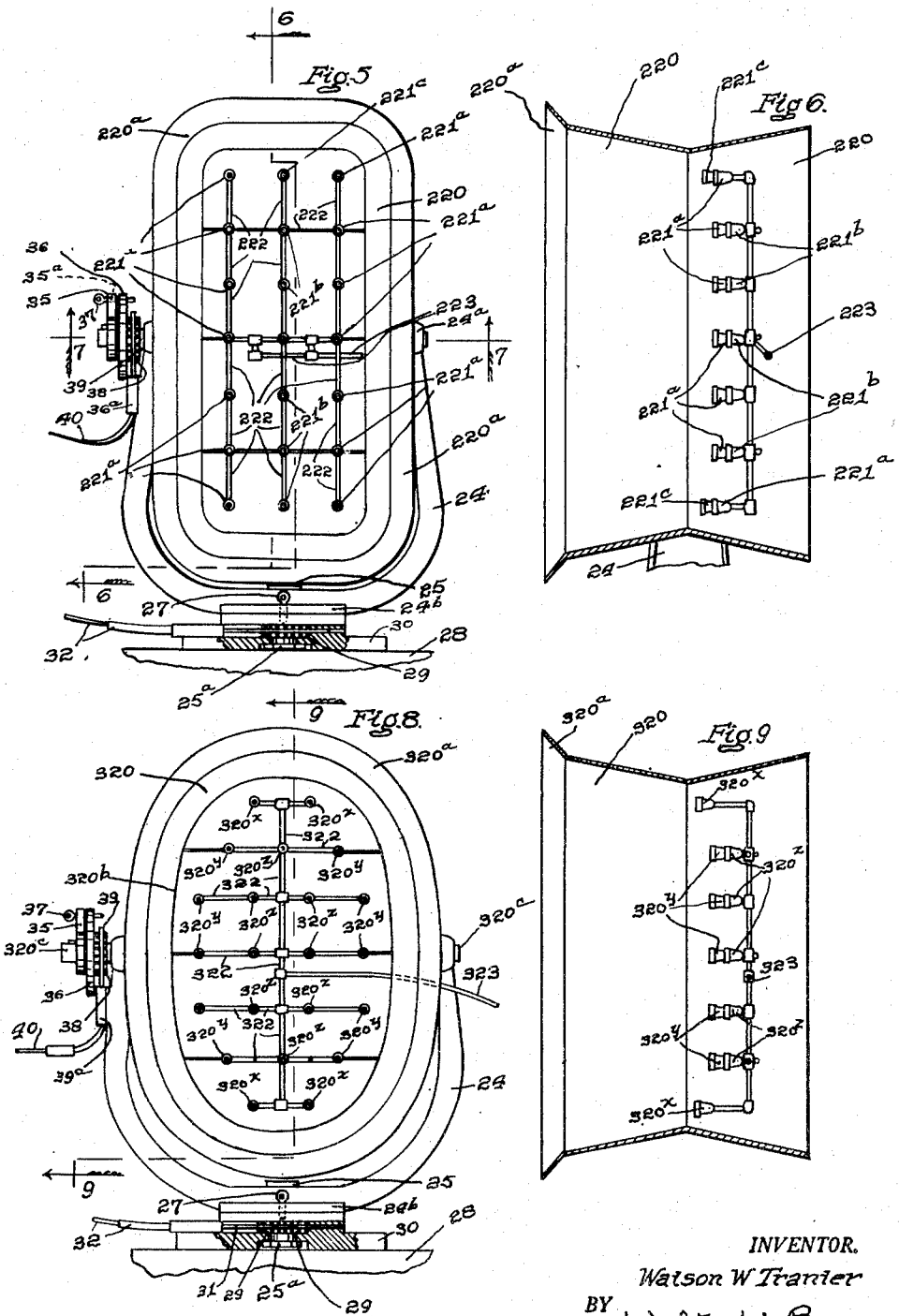

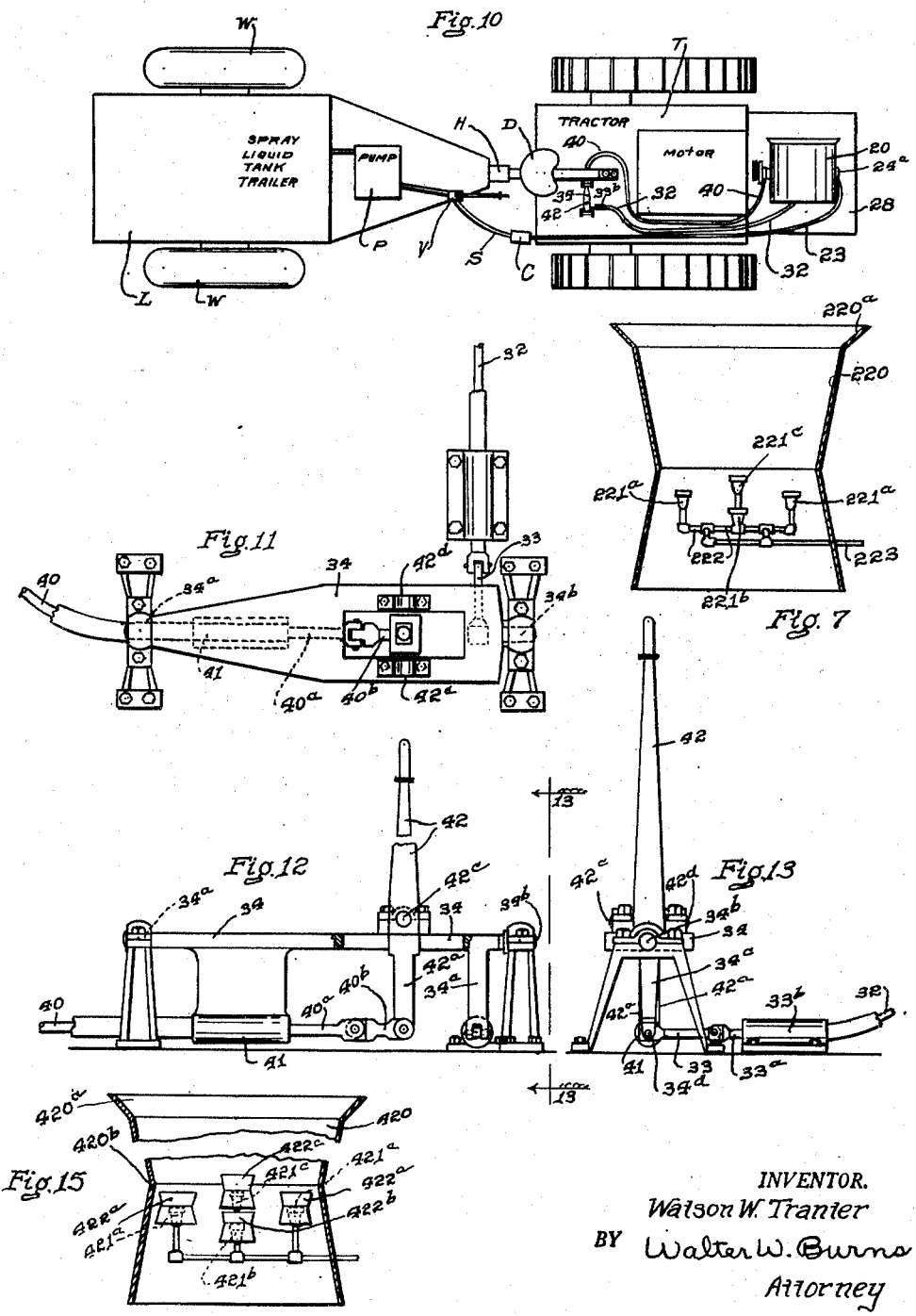

2,561,432

UNITED STATES PATENT OFFICE 2,561,432

SPRAYER

Watson W. Tranter, York, Pa., assignor to A. B. Farquhar Company, York, Pa., a corporation of Pennsylvania Application August 7, 1947, Serial No. 767,039

3 Claims. (Cl. 261—116)

This invention relates to spraying apparatus and has particular relation to power sprayers for orchards, trees and the like.

In the interest of economy one of the main problems, in orchard and other tree spraying, is to separate the spray into very minute particles. This brings about several desirable results. (1) Since the particles float a long time, in the air, because of their small size, there is a greater chance of the spray coming into contact with the under surfaces of the leaves and branches and since the particles stay afloat for a longer period, trees at greater distances from the sprayer will be treated than would otherwise be the case.

If, in addition to causing the spray to be divided into small particles, the liberation of the spray is accompanied by a high velocity air current, the effectiveness is greatly enhanced due to the fact that the fine spray will then be further assisted in its travel to distant trees.

The primary object of this invention is the provision of an improved power spraying mechanism.

Another object of the invention is the provision of an improved power sprayer wherein a spray head is surrounded by an air guide or wind tunnel thereby decreasing eddy currents and increasing the speed of the air.

Still another object of the invention is the provision of an improved power sprayer wherein the spray is forced from the nozzle or nozzles at a high velocity, and a guided air current is permitted to be set up around the nozzle or nozzles.

A further object of the invention is the provision of a power sprayer wherein a spray head is relatively large and is formed of a suitable open-ended tubular member with a plurality of spray nozzles intermediate the open ends, thereby providing, in effect, a Venturi tube with the power to move the air through the spray head, supplied by the velocity of the spray from the nozzles.

A still further object of the invention is the provision of a power sprayer wherein an air current is induced by liquid from high pressure spray nozzles which are enclosed in an air guide or wind tunnel which will produce a blast of spray laden air having a greater cross-sectional length than breadth, to thereby deliver a spray blast which will be more effective than one of constant diameter of cross section.

Another and still further object of the invention is the provision of an improved spray head with nozzles for high pressure spray delivery, the head being so shaped as to practically prevent dripping of the liquid being delivered.

Still another object of the inventiin is the provision of an improved sprayer wherein a sprayer head encloses nozzles which are pointed in the same general direction but which are adjusted to produce the maximum results.

Still another and further object of the invention is the provision of an improved sprayer head wherein spray nozzles are enclosed within tubes which operate as Venturi tubes and a plurality of nozzles and their tubes enclosed within a larger body member which acts as a Venturi tube.

Referring to the drawings wherein there is illustrated several modified forms of the invention, Fig. 1 is a vertical sectional view showing a sprayer head of one form of the invention having a substantially circular cross-section.

Fig. 2 is a side view of the structure shown in Fig. 1.

Fig. 3 is a top plan view of the sprayer head structure of Figs. 1 and 2.

Fig. 4 is a cross section of a modified form of sprayer head.

Fig. 5 is an elevational view illustrating a modified form of the invention showing a substantially rectangular spray head which involves the Venturi principle.

Fig. 6 is a cross section on the line 6—6 of Fig. 5.

Fig. 7 is a cross section on the line 7—7 of Fig. 5.

Fig. 8 illustrates another form of the spray head having an elliptical cross-section.

Fig. 9 is a cross section on the line 9—9 of Fig. 8.

Fig. 10 is a plan view of the invention in the field with a tractor-drawn unit.

Fig. 11 and Fig. 12 are detail views respectively, of the plan and elevation of the hand lever push-pull operating mechanism.

Fig. 13 is a side view of the structure of Figs. 11 and 12.

Fig. 14 is a detail view of the adjustable mechanism for setting the angle of direction of the spray head.

Fig. 15 is a cross sectional view of still another modification of the invention, illustrating a different form of nozzle arranged as shown in Figs. 5, 6, and 7.

Similar reference characters refer to the same or similar parts throughout the specification and drawing.

Referring particularly to Figs. 1 to 3, 20 designates the body member of a spray head which guides the air of the spray past the nozzles as will be later described. In the embodiment of Figs. 1 to 3, the body member is of cylindrical shape. Within the body member 20 are a plurality of nozzles suitably arranged so that the several nozzles are of substantial equidistance from the adjacent nozzles and also from the inner surface of the body member.

The body member or wind tunnel 20 is open at each end along its axis and at one end has a flange 20a which assists in getting the liquid, of the spray, finely divided without causing the formations of drops from the spray; which action when it takes place, destroys the efficiency of the spray head.

The nozzles 21 are supplied with suitable small pipes 22 which are connected with a flexible feeder pipe 23 for supplying the liquid for the nozzles 21, as will be later described. The nozzles 21 are placed substantially in a plane, although they may be varied from an absolute plane to bring about the best air-flow results as will be later described.

The body member or wind tunnel 20 is supported by trunnions 20b which are journaled in bearings 24a supported in the U-shaped frame member 24. The U-shaped member 24 is pivotally mounted at its lower end on a vertical pivot 25, having a nut 25a. On the lower central portion of the U-shaped member 24 is a circular plate 24b which is rigid therewith. This plate 24b has at its outer edge a hole or opening 24d. Below the plate 24b and surrounding the pivot pin 25 is a complementary plate 26. The plate 26 is provided with a series of circumferential holes or openings 26a in positions to coact with the opening or hole 24d of the plate 24b. A pin 27 of a size to pass through the opening 24d and any one of the holes or openings 26a is provided to secure the arm 24c in a fixed adjusted relation to the plate 26. The plate 26 is pivotally mounted with relation to the plate 30 on the platform 28 upon which it is mounted. On the bottom of the plate 26 is mounted a segmental gear 29 with which it revolves. Mounted rigidly with relation to the plate 30, is a guide 30a which guides a rack 31 which in turn is in registry with the segmental gear 29 and is held in place by the plate 30. Connected to the rack 31 is a push-pull flexible cable 32 which operates the rack 31 and extends to the operating link 33 which is pivotally connected by the arm 34c to the horizontal control lever 34. This lever 34, in turn, is pivoted on the frame as at 34a and 34b. The arm 34c is rigid with the lever 34 and is pivotally connected to the link 33 as at 34d. Pivotally connected to the link 33 is a rod 33a which is connected to the flexible cable 32 and is held in position by the guide 33b.

The mechanism just described controls the movement of the spray head in a horizontal plane, the adjustments of the pin 27, controlling the limits of movement of the body member 20. By adjusting the pin 27 to any one of the several holes 26a, different limits of horizontal movement of the plate 24b may be established.

In order to tilt the spray head in a vertical plane, there is provided a mechanism similar to the one just described. At the left side of Fig. 1, the trunnion 20b is provided with an arm 35 which is keyed to the trunnion 20b. A disk 36 is free to rotate on the trunnion but has coacting holes 36a which register with a hole 35a in the arm 35. A suitable pin 37 is provided in the hole 35a for registration with one of the holes 36a. Any one of the holes 36a may be used to receive the pin 37 in accordance with the desired adjustment wanted.

A segmental gear 38 is rigidly secured to the disk 36 on a rack member 39 is provided to mesh with and operate the gear 38. A suitable push-pull mechanism with a guide 39a similar to the one already described for the horizontal adjustment is provided to move the gear 38, the disk 36 and the spray head in a vertical plane.

The push-pull power mechanism will now be described. The flexible cable 40 within its casing extends from the rack member 39 to the control mechanism as illustrated in Figs. 10, 11, 12 and 13 and after passing through the sleeve 41, connects to the lower end 42a of the hand lever 42, by means of the rod 40a and the link 40b. It is to be noted that the hand lever 42 is fulcrumed at 42c, 42d on the lever 34 for operation in one plane and when moved in a substantially vertical plane at right angle to the plane of rotative movement of the lever 34, the flexible rod 40 will be operated to oscillate the spray head in a vertical plane.

From the above description it is believed clear that by movements of the hand lever 42, it is possible to move the spray head both in horizontal and vertical planes.

In Fig. 4, is illustrated a modified form of the invention wherein the spray head is shaped to more clearly illustrate the Venturi principle of this invention. In this form, the body member or wind tunnel 120 of the spray head increases in cross sectional area from a place intermediate its open ends as at 120a and is greatest at the openings. As in the form of Fig. 1, there is a bell shaped flange 120b which due to the expanding effect on the blast of air passing through the body member, has a tendency to expand the volume of the air with a consequent tendency to prevent the formation of drops with the saving resulting from preventing such drop formation.

The nozzles 121 and their pipe structures may, as in the case of the structure of Figs. 1 to 3, be set in a plane as described for Figs. 1 to 3 or they may be set just a little out of the normal plane as will be later described. While the construction as set forth in the description of Figs. 1 to 3 has a tendency to give a Venturi effect, the construction shown in Fig. 4, just described, has a more definite Venturi effect.

In Figs. 5, 6, and 7 is illustrated a form of the invention wherein the shape of the spray head 220 is that of a rectangle with the corners rounded to assist in carrying out the desire in the design of some of the forms, to produce a blast of air which will, while having a greater height than breadth, have a cross section with corners which will be smooth and therefore have less tendency to produce eddy currents.

In Figs. 5, 6, and 7 is also illustrated the feature of placing the nozzles in a substantial plane adjacent the smallest or central cross section, but placing some of them just outside of the plane of other nozzles in order to assist in the formation of the Venturi type of spray-laden air blast. Since the placing of these individual nozzles so as to produce the very best results, cannot be absolutely predetermined, they are placed after experimentation to determine the best results.

In Figs. 5, 6, and 7, the nozzles are placed in three rows so that they are substantially equidistant from each other. However, depending upon the particular shape of the spray head 220 and the results to be accomplished, the nozzles while placed substantially in a plane, may be varied a slight amount to better facilitate the air flow to accomplish the desired result. As illustrated in Figs. 5, 6, and 7, the nozzles 221a forming the two outer of the three rows are placed all in the same plane while the nozzles 221b and 221c although in substantially the same plane as the nozzles 221a are a little out of that plane, the nozzles 221b, as illustrated being placed slightly below the plane of the nozzles 221a and the nozzles 221c being illustrated slightly thereabove.

These nozzles 221a, 221b, 221c are all connected together by the supply pipes 223 which supply pipes are connected to the spray supply 23 as will be later made clear. The body member or wind tunnel 220 is provided with a flange 220a for the same purpose as that of the flange 20a.

Since the operating mechanism for tilting and rotation of the spray head is the same as that already described for the structure of Figs. 1, 2, 3 the description will not be repeated.

In Figs. 8 and 9 is shown a structure wherein the spray head body or wind tunnel 320, with its flange 320a has a relatively smaller mid-section as at 320b with a complement of nozzles designated as 320x, 320y and 320z. These may be substantially all in the same plane or with such slight variations from the plane as may be desired to produce the desired results. The nozzles 320x, 320y, 320z as in the previously described forms are connected together by the pipes 322 and to a suitable high pressure supply pipe 323 as will be later made clear.

As already pointed out, the spray head body or wind tunnel 320 is provided with an outwardly expanding flange 320a which as it expands the air blast, tends to prevent the drop formation with the consequent losses therefrom. The trunnions 320c are similar to the trunnions described as on the previously described forms. The details of construction of the mechanism for tilting the spray head are similar to that described for the other forms of spray head and will not be here repeated.

The spray heads or wind tunnels, 120, 220 and 320 are mounted on supporting members such as the U-shaped frame members 24 to turn in a vertical plane and in a horizontal plane as previously described for the spray head 20.

In Fig. 10 is illustrated diagrammatically one way of using this invention.

A tractor T is provided with a forward platform 28 already described, upon which the spray head is supported by the U-shaped frame member 24. Connected to the high pressure line 23, 223, 323, as the case may be, is the high pressure supply line S. This supply line S is connected to the high pressure line 23, 223, or 323 by a suitable coupling C. The rear end of the supply pipe S is connected through a high pressure pump P to the liquid tank L, which is mounted on the wheels W.

The tractor T and the tank trailer L are connected together with the hitch H. A coupling C connects the supply pipe S with the high pressure line 23, 223 or 323. The operative sitting on the driver's seat D is in position to not only operate the tractor but is in position to also operate the quick-closing valve V to cut off the pressure when the operative so desires.

In Fig. 15 is illustrated the cross section of a spray head having the nozzles arranged in Venturi tubes within the larger spray head body which latter operates as an outer venturi. The body or wind tunnel 420 has a flange 420a and a restricted cross section as at 420b. Nozzles 421a, 421b, 421c are arranged similarly to nozzles 221a, 221b, 221c, and are suitably supplied with high pressure liquid connections as previously described for the nozzles 20. Surrounding each nozzle 421a, 421b, 421c are Venturi tubes 422a, 421b, 421c. Thus in effect we have a venturi for each nozzle and the spray housing forming in effect an outer venturi for the whole air blast. The angles of the axes of the nozzles may be varied slightly relative to the axis of the spray head if found to be desired.

While several modifications of the invention have been illustrated and described in detail, it is to be understood that the disclosures are merely illustrative and that modifications and changes may be made without departing from the spirit of the invention and within its scope as claimed.

Having described the invention, what is claimed is:

1. A sprayer head comprising a double open-ended body member forming a wind tunnel, a plurality of jets between and at substantial distances from the ends of the tunnel and having their axes substantially parallel and pointing in substantially the same direction, the open ends of the body member being open to free atmosphere and the tunnel being substantially free of obstructions to provide for free axial passage through the tunnel and means for pivotally supporting the body member and jets for directing a spray at various angles to the horizontal.

2. A sprayer head comprising a double open-ended body member forming a wind tunnel, a plurality of jets between the ends of the tunnel, the jets being spaced substantially the same distance from each other and from the adjacent sides of the tunnel with their axes substantially parallel and pointing in substantially the same direction, the open ends of the body member being open to free atmosphere and the tunnel being substantially free of obstructions to provide for free axial passage through the tunnel.

3. A sprayer comprising a double open-ended body member forming a wind tunnel, a plurality of jets between the ends of the tunnel, the jets being spaced substantially the same distance from each other and from the adjacent sides of the wind tunnel with their axes substantially parallel and pointing in substantially the same direction, the open ends of the body member being open to free atmosphere and the tunnel being substantially free of obstructions to provide for free axial passage through the tunnel, and means for pivotally supporting the wind tunnel with its jets.

WATSON W. TRANTER.

REFERENCES CITED

The following references are of record in the file of this patent:

UNITED STATES PATENTS

| Number | Name | Date |
| --- | --- | --- |
| 1,565,593 | Sausen | Dec. 15, 1925 |
| 1,658,533 | Mart | Feb. 7, 1928 |
| 1,791,814 | Hillery | Feb. 10, 1931 |
| 2,238,120 | Launder | Apr. 15, 1941 |

FOREIGN PATENTS

| Number | Country | Date |
| --- | --- | --- |
| 11,740 | Great Britain | June 28, 1900 |
| 502,828 | Germany | Aug. 3, 1927 |
| 80,723 | Sweden | Apr. 19, 1934 |